US007088988B2

(12) United States Patent
Kelkar et al.

(10) Patent No.: US 7,088,988 B2
(45) Date of Patent: Aug. 8, 2006

(54) OVER-THE-AIR SUBSIDY LOCK RESOLUTION

(75) Inventors: Uday Kelkar, Grayslake, IL (US); Naveen Aerrabotu, Gurnee, IL (US)

(73) Assignee: Motorola Inc., Schaumburg, IL (US)

( * ) Notice: Subject to any disclaimer, the term of this patent is extended or adjusted under 35 U.S.C. 154(b) by 232 days.

(21) Appl. No.: 10/292,786

(22) Filed: Nov. 12, 2002

(65) Prior Publication Data

US 2004/0092248 A1    May 13, 2004

(51) Int. Cl.
    *H04M 1/66*    (2006.01)
(52) U.S. Cl. ................................. 455/411; 455/558
(58) Field of Classification Search .............. 455/411, 455/410, 418, 419, 420, 466, 409, 405, 456.1–457, 455/435.1, 414.1, 517, 558, 26.1, 528, 565; 713/173; 726/20
    See application file for complete search history.

(56) References Cited

U.S. PATENT DOCUMENTS

| 5,438,612 | A | * | 8/1995 | Norimatsu | 455/565 |
| 5,444,764 | A | * | 8/1995 | Galecki | 455/411 |
| 5,794,142 | A | * | 8/1998 | Vanttila et al. | 455/419 |
| 5,864,757 | A | * | 1/1999 | Parker | 455/418 |
| 5,915,225 | A | * | 6/1999 | Mills | 455/558 |
| 6,360,092 | B1 | * | 3/2002 | Carrara | 455/411 |
| 6,799,155 | B1 | * | 9/2004 | Lindemann et al. | 455/558 |
| 6,801,765 | B1 | * | 10/2004 | Roo et al. | 455/411 |
| 2001/0016486 | A1 | | 8/2001 | Ko | |
| 2004/0198311 | A1 | * | 10/2004 | Aerrabotu et al. | 455/411 |

OTHER PUBLICATIONS

Digital cellular telecommunications system (Phase 2+); Personalisation of GSM Mobile Equipment (ME); Mobile functionality specification (GSM 02.22 version 6.0.0 Release 1997), European Telecommunications Standards Institute, Jan. 1999, 23 pages.

Digital cellular telecommunications system; Unstructured Supplementary Service Data (USSD)—Stage 3 (GSM 04.90 version 5.0.1), European Telecommunications Standards Institute, May 1997, 16 pages.

\* cited by examiner

*Primary Examiner*—Eliseo Ramos-Feliciano
(74) *Attorney, Agent, or Firm*—Joseph T. Cygan

(57) ABSTRACT

Methods (100, 200, 300) in a wireless portable communication device and wireless communication network for resolving subsidy lock by transmitting and receiving messages over-the-air are provided. Upon entering a restricted mode of operation (118, 204), the wireless portable communication device transmits a request to the wireless communication network requesting to deactivate the restricted mode of operation (120, 212). In response, the wireless portable communication device receives a message deactivating the restricted mode of operation (122, 214).

11 Claims, 3 Drawing Sheets

OVER-THE-AIR SUBSIDY LOCK RESOLUTION

FIELD OF THE INVENTION

The present inventions relate generally to wireless communications, more specifically to resolving subsidy lock using an over-the-air method in a wireless communication device.

BACKGROUND OF THE INVENTION

In a wireless portable communication device, such as a cellular telephone in used in Global System for Mobile Communications ("GSM"), a Subscriber Identification Module ("SIM") card is used to store various information pertaining to a subscriber. Generally, the subscriber is able to use any compatible cellular telephone by inserting the SIM card into the cellular telephone, provided that the subscriber is able to access the SIM card. The subscriber may be locked out of the SIM card if he fails to enter the correct access code such as a password within a predetermined time or within a predetermined number of attempts, or when his contract with the service provider expires. When the subscriber is locked out, the SIM card allows the subscriber to make only an emergency call. After a predetermined lockout period expires, the subscriber is allowed to re-enter the password, and the phone is placed in a normal operation mode upon successful entry of the password.

In a wireless communication network, a subsidized subscriber generally has an agreement with a subsidizing network service provider for a specified period as defined in the contract. A subsidized wireless portable communication device used in the wireless communication network features a module such as a SIM card having a subsidy lock mode, which prevents the subscriber from making voice or data calls or Short Message Service ("SMS") message in a network other than that of the subsidizing network service provider. For the subscriber to be able to use the wireless portable communication device in a non-subsidizing network or after the expiration of the contract, the subscriber must enter an access code provided by the subsidizing network service provider to access the SIM card. Otherwise, the subscriber is only allowed to make an emergency call. The access code is generally provided via a voice call to a service center. In some case, however, the subsidized wireless portable communication device needs be taken to the service center for unlocking and/or renewing of the service contract to avoid disclosure of the access code by the subsidizing network service provider.

DETAILED DESCRIPTION OF THE PREFERRED EMBODIMENT(S)

Figure 1:
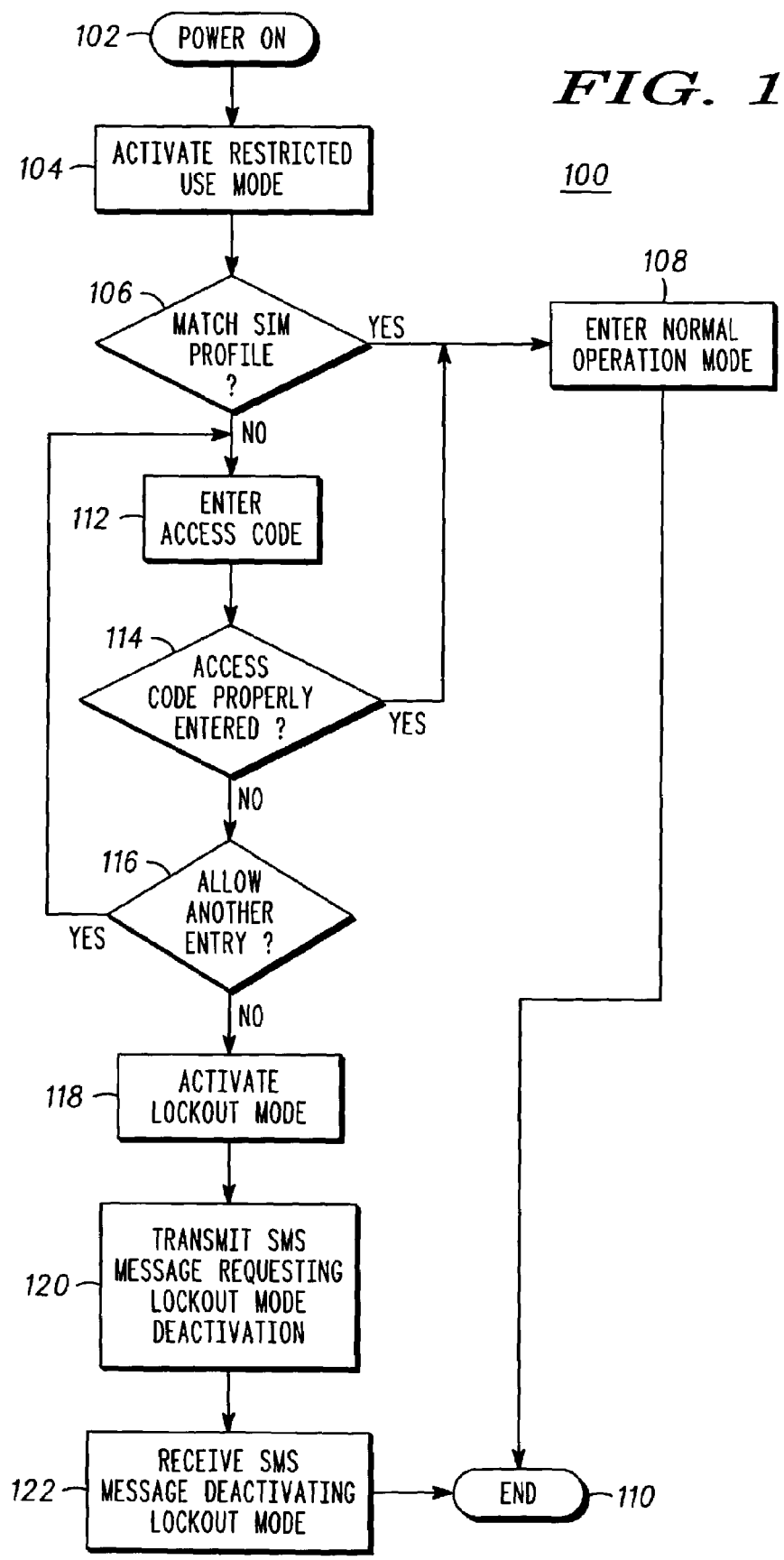
FIG. 1 is an exemplary flowchart of one of the aspects of the present inventions regarding a wireless portable communication device.

The present inventions generally relate to methods in a subsidized wireless portable communication device operating in a communication network. FIG. 1 illustrates an exemplary flowchart of one of the aspects of the present inventions. The subsidized wireless portable communication device, while operating in a subsidizing communication network, experiences no use restriction other than the restrictions imposed by a subscription contract. For a subsidized wireless portable communication device having a removable module containing all the necessary subscriber information, such as a Global System for Mobile Communications ("GSM") cellular telephone having a Subscriber Identification Module ("SIM"), an access code must be entered when the subsidized wireless portable communication device is powered on with a SIM card that does not match a SIM card profile stored in the subsidized wireless portable communication device in order to enter a normal operation mode.

In block 102, the subsidized wireless portable communication device having a SIM card is powered on, and begins to operate in a restricted use mode in block 104. In block 106, whether the SIM card in the subsidized wireless portable communication device matches a SIM card profile stored in the subsidized wireless portable communication device is determined. If the SIM card matches the SIM card profile stored in the subsidized wireless portable communication device, the wireless portable communication enters a normal operation mode in block 108, and the process terminates in block 110. If the SIM card does not match the SIM card profile stored in the subsidized wireless portable communication device in block 106, then the subsidized wireless portable communication device requests an access code to be entered in block 112. An access code may also be required in order to operate the subsidized wireless portable communication device in an unsubsidizing communication network after the expiration of the subscription contract. Without entering the access code, the wireless portable communication device remains in the restricted use mode, and only allows the subscriber to initiate an emergency call. In block 114, the subsidized wireless portable communication device determines whether the access code has been entered properly. If the access code has been entered properly, the subsidized wireless portable communication device enters the normal operation mode in block 108, and the process terminates in block 110. If the access code has been improperly entered, another attempt to enter the access code property may be allowed if a predetermined condition is met in block 116, and the process may be repeated from block 112. The predetermined condition may be a number of attempts allowed or a time period allowed within which the access code must be entered. Otherwise, the subsidized wireless portable communication device enters into a lockout mode in block 118, preventing the subscriber from further attempts to enter the access code. While in the lockout mode, the subsidized wireless portable communication device is only allowed to initiate a voice call to an emergency telephone number and a Short Message Service ("SMS") message to the subsidized communication network. In order to deactivate the lockout mode, a first SMS message requesting to deactivate the lockout mode is transmitted in block 120. Additional information to authenticate the request maybe transmitted as a part of the first SMS message such as a distinct password maintained by the subsidizing communication network but not maintained within the SIM, for example, the maiden name of the subscriber's mother, billing information, or a new contract agreement. Then, in block 122, the subsidized wireless portable communication device receives a second SMS message deactivating the lockout mode in response to transmitting the first SMS message requesting to deactivate the lookout mode, and the process terminates in block 110. The second SMS message may trigger an application, residing in the subsidized wireless portable communication device or in the SIM, to deactivate the lockout mode. The second SMS message deactivating the lockout mode may also deactivate the restricted use mode and may place the subsidized wireless portable communication device in the normal operation mode without requiring the subscriber to re-enter the access code. The second SMS message deactivating the lockout mode may be received only after the request has been authenticated. If the process has been due in part to the expiration of the current subscription contract, a new contract maybe negotiated as apart of transmitting the first SMS message requesting to deactivate the lockout mode mid receiving the second SMS message deactivating the lockout made. Alternatively, the message received by the subsidized wireless portable communication device deactivating the lockout mode in block 122 may take a form of an Unstructured Supplementary Service Data ("USSD") as described in ETS 300 957 (GSM 04.90 version 5.0:1).

Figure 2:
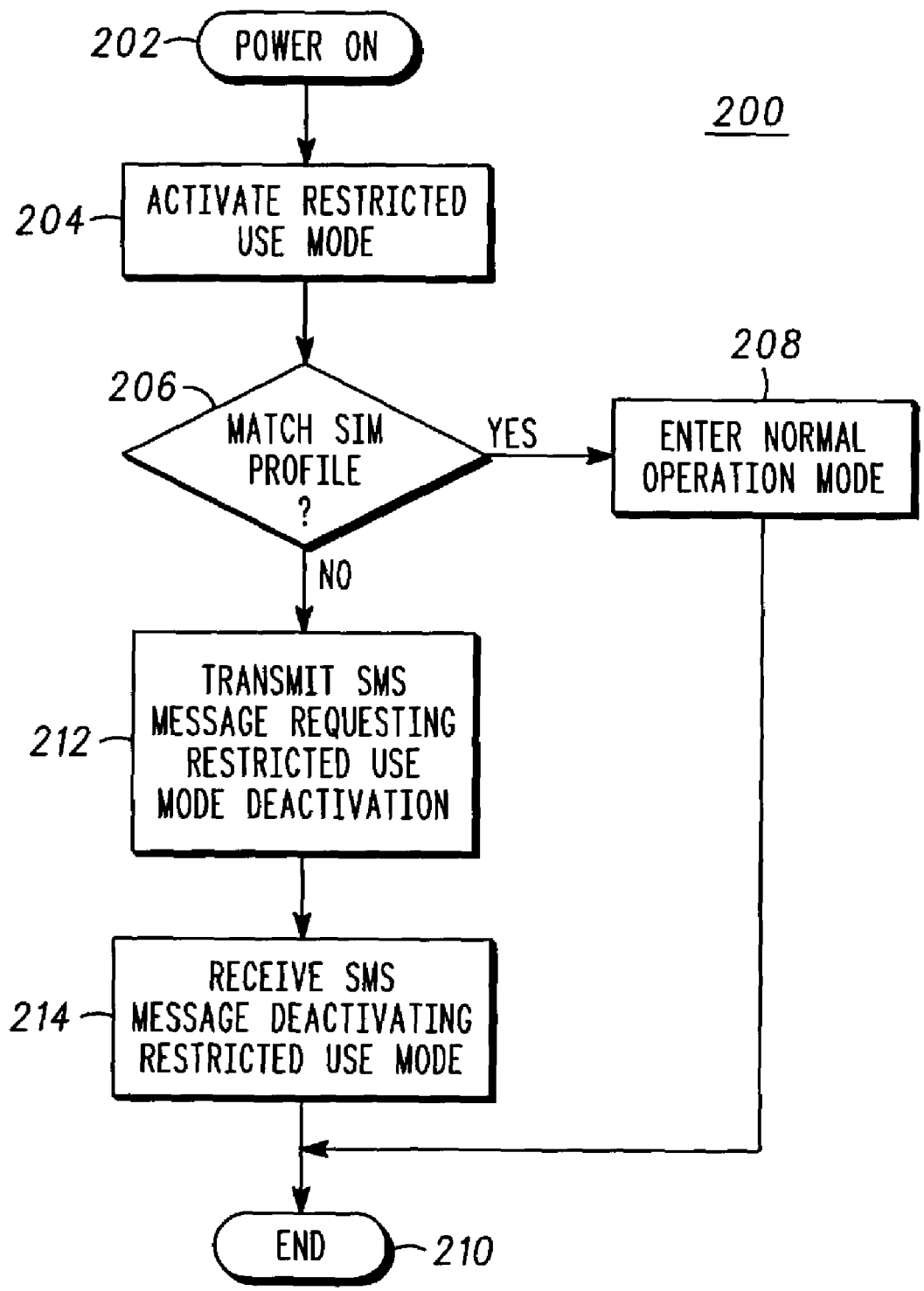
FIG. 2 is an exemplary flowchart of another aspect the present inventions regarding a wireless portable communication device.

FIG. 2 illustrates an exemplary flowchart of another aspect of the present inventions. In block 202, the subsidized wireless portable communication device is powered on, and begins to operate in a restricted use mode in block 204. In block 206, whether the SIM card in the subsidized wireless portable communication device matches a SIM card profile stored in the subsidized wireless portable communication device is determined. If the SIM card matches the SIM card profile stored in the subsidized wireless portable communication device, the wireless portable communication enters a normal operation mode in block 208, and the process terminates in block 210. If the SIM card does not match the SIM card profile stored in the subsidized wireless portable communication device in block 206, the subsidized portable wireless communication device remains in the restricted use mode, and is only allowed to initiate a voice call to an emergency telephone number and a Short Message Service ("SMS") message to the subsidized communication network. To deactivate the restricted use mode and place the subsidized wireless portable communication device in a normal operation mode, the subscriber may transmit a first SMS message requesting to deactivate the restricted use mode using one of the allowed operations in the restricted use mode in block 212. Additional information to authenticate the request may be transmitted as a part of the SMS message. The subsidized wireless portable communication device then receives a second SMS message in block 214, which deactivates the restricted use mode, in response to transmitting the first SMS message requesting to deactivate the restricted use mode, and the process terminates in block 210. The second SMS message may trigger an application, residing in the subsidized wireless portable communication device or in the SIM, to deactivate the lockout mode. The second SMS message deactivating the restricted use mode may be received only after the request has been authenticated. A new contract, which allows the subscriber a limited use of the subsidized wireless portable communication device, may be negotiated as a part of transmitting the SMS message requesting to deactivate the restricted use mode and receiving the SMS message deactivating the restricted use mode. Alternatively, the message received by the subsidized wireless portable communication device deactivating the lockout mode in block 214 may take a form of an Unstructured Supplementary Service Data ("USSD") as described in ETS 300 957 (GSM 04.90 version 5.0.1).

Figure 3:
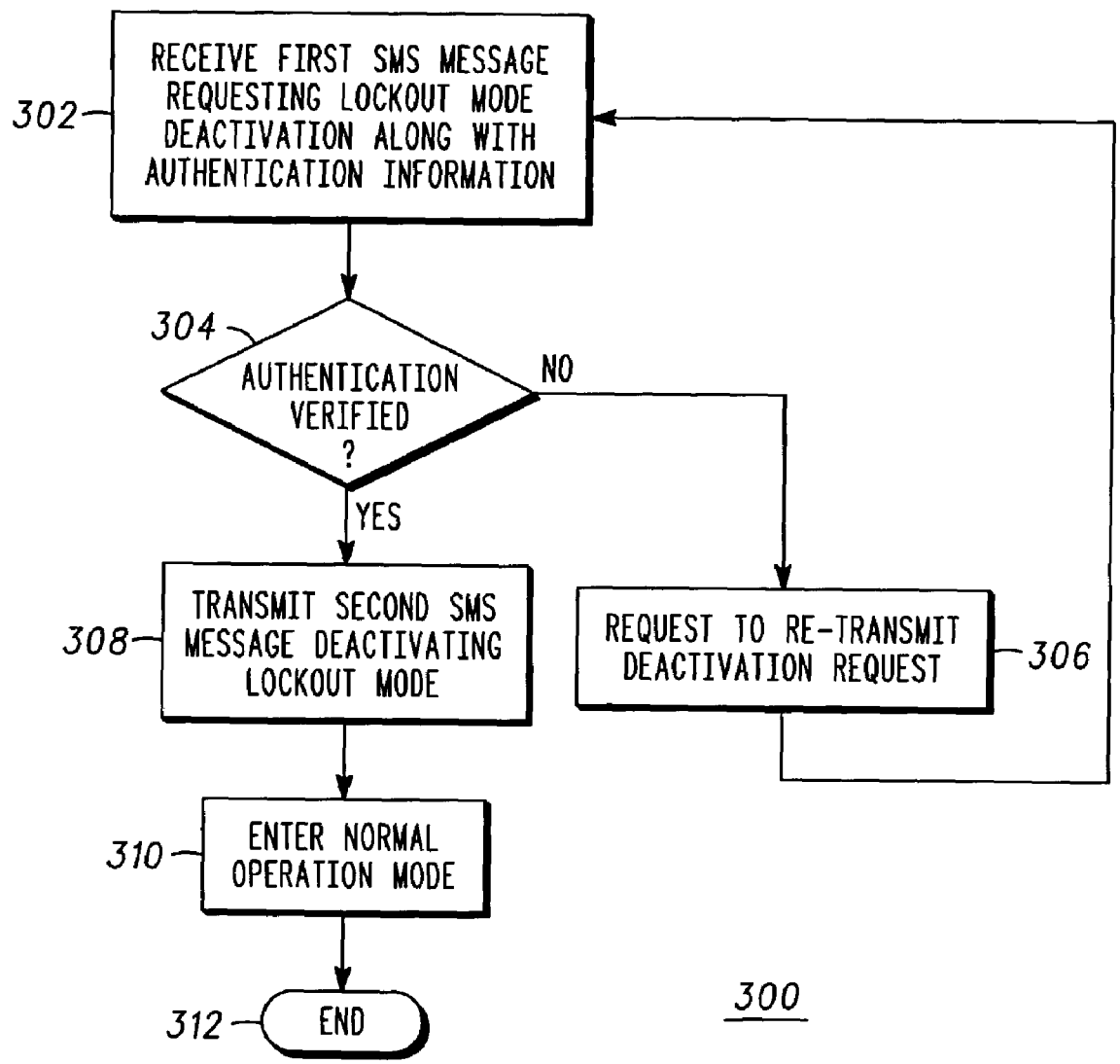
FIG. 3 is an exemplary flowchart of another aspect the present inventions regarding a wireless communication network.

FIG. 3 illustrates an exemplary flowchart of another aspect of the present inventions regarding a wireless communication network. The wireless communication network provides a subsidized service to the wireless portable communication device. The wireless portable communication device is equipped with a removable module which contains all relevant user information necessary to enable the wireless portable communication device to function normally within the wireless communication network. However, once the access to the removable module containing all relevant user information is denied, the wireless communication device enters a lockout mode, and is only allowed to initiate a voice call to an emergency telephone number and a Short Message Service ("SMS") message to the wireless communication network. In block 302, the wireless communication network receives a first SMS message from the wireless portable communication device being in the lockout mode requesting to have the lockout mode deactivated. The first SMS message may further contain authentication information to help verify a valid use of the wireless portable communication device in the wireless communication network. If the authentication information is not verified in block 304, then the wireless communication network transmits a request to the wireless portable communication device to re-transmit the lockout mode deactivation request in block 306. The process then repeats from block 302, and may terminate after a predetermined number of re-transmissions. If the authentication information is verified in block 304, then the wireless communication network transmits a second SMS message to the wireless communication device deactivating the lockout mode in block 308. The second SMS message may trigger an application, residing in the subsidized wireless portable communication device or in the SIM, to deactivate the lockout mode. Alternatively, the message transmitted by the wireless communication network deactivating the lockout mode in block 308 may take a form of an Unstructured Supplementary Service Data ("USSD") as described in ETS 300 957 (GSM 04.90 version 5.0.1). The wireless portable communication device then enters its normal operation in block 310, and the process terminates in block 312. The normal operation may be a result of a new subscription contract or a result of a one-time-use agreement.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless portable communication device having a removable Subscriber Identity Module (SIM) and a lockout mode of operation, the method comprising:

comparing a first profile stored in said wireless portable communication device to a second profile stored in said SIM;

determining whether said first profile and said second profile are different;

activating a restricted use mode in response to determining that said first profile and said second profile are different, the restricted use mode deactivatable by receiving an access code, wherein the access code is input by a user;

activating the lockout mode upon failing to receive the access code under a predetermined condition;

restricting communications to and from the wireless portable communication device while in the lockout mode;

permitting, in response to activating the lockout mode, transmission of a request to deactivate the lockout mode while in the lockout mode, the request consisting essentially of a first Short Message Service message requesting to deactivate the lockout mode to a service provider; and receiving, in response to the transmission of a request to deactivate the lockout mode while in lockout mode, a message to deactivate the lockout mode, the message to deactivate the lockout mode comprising a second Short Message Service message, said second Short Message Service message activating an application residing in said SIM, said application deactivating the lockout mode.

2. The method of claim 1, wherein activating a restricted use mode includes activating the restricted use mode upon powering on the wireless portable communication device.

3. The method of claim 1, wherein activating a restricted use mode includes activating the restricted use mode upon expiring of a contract between the wireless portable communication device and an associated communication network.

4. The method of claim 1, wherein activating the lockout mode includes activating the lockout mode upon failing to receive the access code under a predetermined condition by failing to receive the access code within a predetermined number of attempts.

5. The method of claim 1, wherein activating the lockout mode includes activating the lockout mode upon failing to receive the access code under a predetermined condition by failing to receive the access code within a predetermined time.

6. The method of claim 1, wherein restricting communications to and from the wireless portable communication device includes restricting communications to and from the wireless portable communication device while in the lockout mode by only allowing to initiate a voice call to an emergency telephone number and a Short Message Service message to a service provider.

7. The method of claim 6, wherein receiving a message to deactivate the lockout mode includes receiving the message to deactivate the lockout mode by receiving an Unstructured Supplementary Service Data message deactivating the lockout mode in response to transmitting the first Short Message Service message to the service provider requesting to deactivate the lockout mode.

8. The method of claim 6, wherein transmitting a first Short Message Service message includes transmitting the first Short Message Service message to the service provider requesting to deactivate the lockout mode by providing authentication information in the first Short Message Service message.

9. The method of claim 8, wherein receiving a message to deactivate the lockout mode includes receiving the message to deactivate the lockout mode by receiving a second Short Message Service message deactivating the lockout mode in response to transmitting the first Short Message Service message to the service provider requesting to deactivate the lockout mode after the authentication information is verified.

10. The method of claim 8, wherein receiving a message to deactivate the lockout mode includes receiving the message to deactivate the lockout mode by receiving an Unstructured Supplementary Service Data message deactivating the lockout mode in response to transmitting the first Short Message Service message to the service provider requesting to deactivate the lockout mode after the authentication information is verified.

11. The method of claim 1, wherein activating the lockout mode includes activating the lockout mode without permitting deactivation of the lockout mode by the access code, usable for deactivating the restricted mode, during the lockout mode.

* * * * *